Nov. 10, 1959    G. D. LEWIS ET AL    2,911,788
SCREECH SENSING DEVICE
Filed Dec. 14, 1956
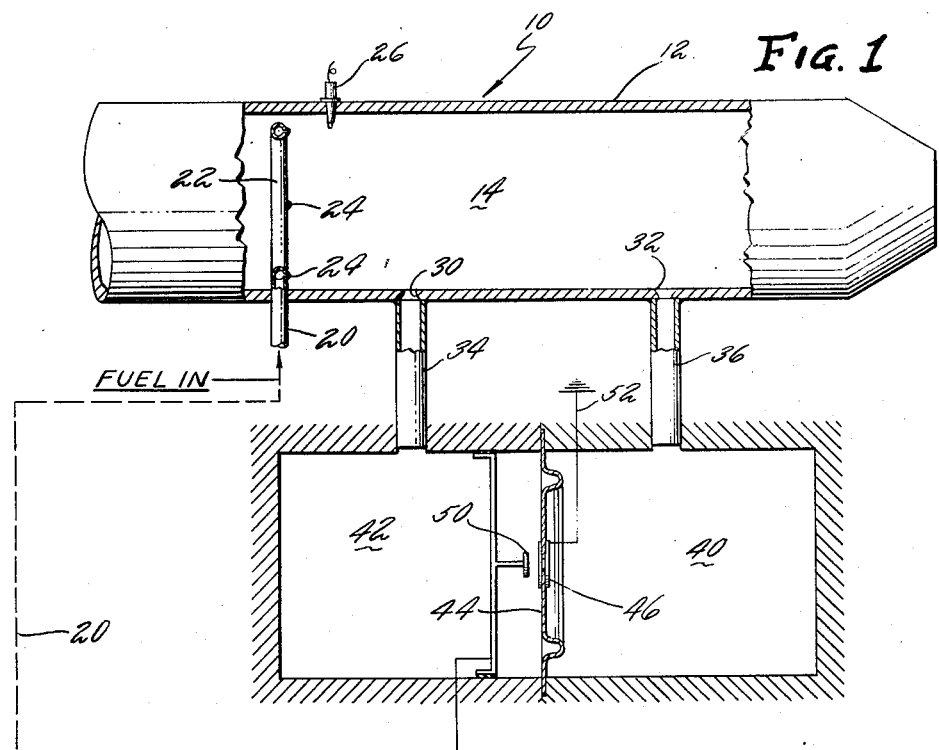
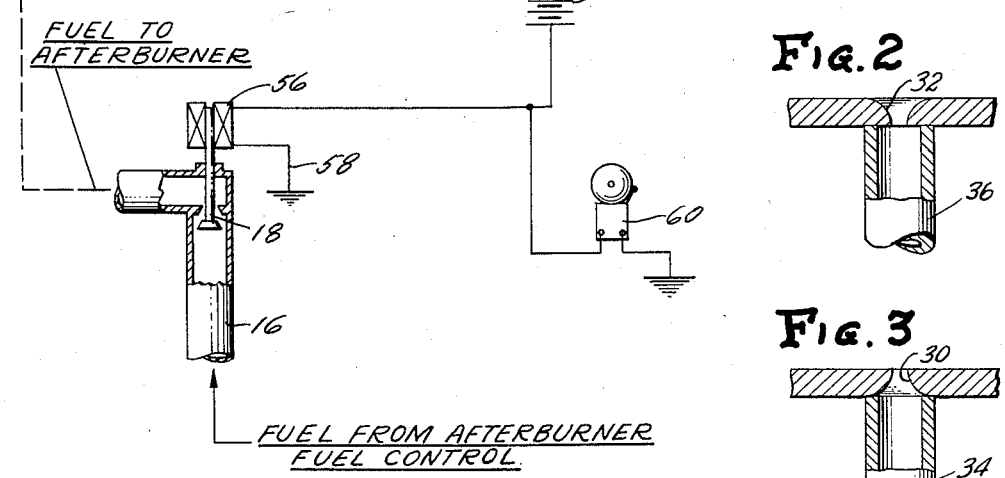
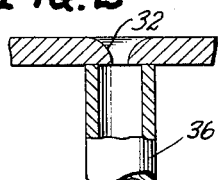
INVENTORS
GEORGE D. LEWIS
ARTHUR W. BLACKMAN JR.
BY
ATTORNEY

United States Patent Office 2,911,788
Patented Nov. 10, 1959

2,911,788

SCREECH SENSING DEVICE

George D. Lewis, Manchester, and Arthur W. Blackman, Jr., Newington, Conn., assignors to United Aircraft Corporation, East Hartford, Conn., a corporation of Delaware Application December 14, 1956, Serial No. 628,462

5 Claims. (Cl. 60—39.09)

This invention relates to combustion chambers and more particularly to high output combustion chambers which are susceptible to high frequency oscillatory combustion, commonly referred to as screech.

The destructive qualities of uncontrolled screech warrant the provision of a protective system or protection device in aircraft power plant installations and in test stand operations.

It is therefore an object of this invention to provide a protection or warning system for combustion chambers which are subject to high frequency oscillatory combustion or screech.

It is a further object of this invention to sense pressures at two axially or circumferentially spaced positions in the combustion chamber with the pressure taps comprising ports or passages having dissimilar flow coefficients depending upon the direction of flow through the ports.

It is a still further object of this invention to provide a means for comparing the pressures sensed by the specially chosen port configurations so as to operate a fuel cut-off or operate another warning device upon the combustion oscillations reaching a predetermined amplitude.

These and other objects of this invention will become readily apparent from the following detailed description of the drawing in which—

Fig. 1 is a schematic illustration of the screech sensing device of this invention, and Figs. 2 and 3 are enlarged views of the sensing ports of Fig. 1.

Referring to the drawing, a combustion chamber is generally indicated at 10 as having an outer wall 12 defining a longitudinal duct 14. The duct 14 may represent an ordinary combustion chamber or an afterburner or ramjet combustion chamber. It is primarily in the latter two types of combustion chambers where high frequency oscillatory combustion may occur.

Fuel under pressure may be supplied from a suitable fuel control to the pipe 16 past the shut-off valve 18 then to the line 20 leading to the fuel distributing ring 22. Fuel injected from the nozzles 24 may be ignited by a suitable spark plug 26 or similar igniting device.

When the oscillatory combustion known as screech reaches a predetermined amplitude, it is desirable to provide a warning signal or to cut off the fuel flow to prevent the amplitude from reaching destructive values. In order to sense this increase in amplitude of the high frequency oscillations, a pair of ports or passages 30 and 32 are provided. The passages 30 and 32 are spaced along the axis of flow through the combustion chamber or around the circumference of the duct 14. The port or passage 30 is so contoured such that flow from the duct 14 to the conduit 34 is restricted because the flow is presented with an orifice or passage very much like a sharp edged orifice. However, on the other hand, flow from the conduit 34 to the duct 14 is presented with a smoothly contoured path such that the flow coefficient in the direction of the duct 14 from the line 34 is greatly increased. The port or passage 32 is contoured just the opposite from the port 30 so that the flow coefficient from the duct 14 to the conduit 36 is higher than flow in the opposite direction. Thus, when there is a pulsating pressure in the combustion chamber duct 14, this produces a pulsating flow in both passages 30 and 32. As a result of the contours of the passages 30 and 32, there will be a tendency to accumulate fluid in the chamber 40 leading from the port 32 and a tendency to expel fluid from the chamber 42 which is connected to the port 30 via the conduit 34. This tendency of the flow during pulsations results in an average pressure difference between the chambers 40 and 42, which is proportional to the amplitude of the pressure oscillations. When the pressure differential between the chambers 40 and 42 reaches a predetermined value, the diaphragm 44 will be deflected so that its contact 46 will engage contact 50. The contact 46 is connected via a line 52 to ground, while on the other hand, the contact 50 is connected to a suitable source of power such as a battery 54. The battery 54 is connected to a solenoid 56 which has its other end to ground via the line 58. Thus, when engagement is made between the contact 46 and the contact 50, the solenoid 56 will be energized so as to cause the valve 18 to immediately shut off fuel leading to the line 20 and the fuel distributor 22. Such action immediately will prevent the pressure oscillations in the combustion chamber from reaching a destructive value. A warning bell 60 is also provided in the system and can be used alone or in conjunction with the solenoid shut-off 56. The warning bell 60 could be used in a test cell or an aircraft installation to warn the controller to immediately reduce fuel flow if fuel was being manually controlled.

It will be apparent that, as a result of this invention, an extremely simple yet highly effective mechanism has been provided for sensing combustion chamber screech and further providing a means for decreasing fuel flow or warning such a critical condition has been reached.

Although only one embodiment of this invention has been illustrated and described herein, it will be apparent that various changes and modifications may be made in the construction and arrangement of the various parts without departing from the scope of this novel concept.

What it is desired by Letters Patent is:

1. In combination with a combustion chamber which is subject to high frequency oscillatory combustion, a pair of passages leading from said combustion chamber, one of said passages being shaped to form a smooth contoured nozzle for a high gas discharge coefficient for flow out of the combustion chamber and being shaped to present a sharp edged orifice for a low gas discharge coefficient for flow into the combustion chamber, the other of said passages being shaped to form a sharp edged orifice for a low gas discharge coefficient for flow out of said combustion chamber and being shaped to form a smooth contoured nozzle for a high gas discharge coefficient for flow into said combustion chamber, a pair of chambers each communicating with one of said passages, means for sensing the pressure in each of said chambers, and means responsive to said sensing means for altering a characteristic of operation of the combustion chamber.

2. In combination with a combustion chamber which is subject to high frequency oscillatory combustion, a pair of passages leading from said combustion chamber and being spaced apart, one of said passages being smoothly shaped for a high gas discharge coefficient out of the combustion chamber and being shaped to present a sharp edge orifice for a low gas discharge coefficient into the combustion chamber, the other of said passages being shaped to present a sharp edge orifice for a low gas discharge coefficient out of said combustion chamber and being smoothly shaped for a high gas discharge coefficient into said combustion chamber, a pair of chambers each communicating with one of said passages, means for sensing the pressure differential between said chambers, and means responsive to said sensing means for altering a characteristic of operation of said combustion chamber.

3. In combination with a combustion chamber which is subject to high frequency oscillatory combustion, means for regulating the flow of fuel to said combustion chamber, a pair of passages leading from said combustion chamber, one of said passages being smoothly shaped for a high gas discharge coefficient out of the combustion chamber and being shaped to present a sharp edge orifice for a low gas discharge coefficient into the combustion chamber, the other of said passages being shaped to present a sharp edge orifice for a low gas discharge coefficient out of said combustion chamber and being smoothly shaped for a high gas discharge coefficient into said combustion chamber, a pair of chambers each communicating with one of said passages, means for sensing the pressure in each of said chambers, and means responsive to said sensing means sensing a predetermined pressure differential for controlling said fuel regulating means.

4. In combination with a combustion chamber which is subject to high frequency oscillatory combustion, a pair of passages leading from said combustion chamber, one of said passages being smoothly shaped for a high gas discharge coefficient out of the combustion chamber and being shaped to present a sharp-edge orifice for a low gas discharge coefficient into the combustion chamber, the other of said passages being shaped to present a sharp-edge orifice for a low gas discharge coefficient out of said combustion chamber and being smoothly shaped for a high gas discharge coefficient into said combustion chamber, a pair of chambers each communicating with one of said passages, diaphragm means for sensing the pressure differential across said chambers, electrical means energized by a given deflection of said diaphragm, and a device operated by said electrical means.

5. In combination with a chamber having a wall forming a longitudinal duct, means for passing a fluid through said duct which fluid is subject to pulsating pressures, a pair of ports in said wall, one of said ports being formed in the shape of a nozzle for the flow out of said duct and presenting a sharp edged orifice for flow into said duct, the other of said ports being shaped to form a sharp edged orifice for the flow out of said duct and formed to present to the flow a smooth orifice for the flow into said duct, a passage connected to each of said ports, a chamber in fluid communication with each of said passages, means sensing the pressure differential between said chambers, means providing a signal upon said pressure differential reaching a predetermined value, and a receiver receiving signal to vary a condition in said duct.

References Cited in the file of this patent

UNITED STATES PATENTS

| | | |
|---|---|---|
| 1,852,164 | Holzwarth | Apr. 5, 1932 |
| 2,418,712 | Heymann | Apr. 8, 1947 |
| 2,724,947 | Meyer | Nov. 29, 1955 |
| 2,748,565 | Billman et al. | June 5, 1956 |
| 2,750,741 | Leeper | June 19, 1956 |